(12) United States Patent
Dillon

(10) Patent No.: US 9,244,201 B2
(45) Date of Patent: Jan. 26, 2016

(54) DIFFUSE REFLECTING OPTICAL CONSTRUCTION

(76) Inventor: Stephen M. Dillon, Scottsdale, AZ (US)

( * ) Notice: Subject to any disclaimer, the term of this patent is extended or adjusted under 35 U.S.C. 154(b) by 706 days.

(21) Appl. No.: 13/506,549

(22) Filed: Apr. 27, 2012

(65) Prior Publication Data

US 2013/0271840 A1    Oct. 17, 2013

Related U.S. Application Data

(60) Provisional application No. 61/624,279, filed on Apr. 14, 2012.

(51) Int. Cl.
*G02B 5/02* (2006.01)
*G02B 1/10* (2015.01)

(52) U.S. Cl.
CPC .............. *G02B 1/105* (2013.01); *G02B 5/0221* (2013.01)

(58) Field of Classification Search
CPC ............ G02B 1/10–1/105; G02B 1/14; G02B 5/02–5/0231; G02B 5/0808
See application file for complete search history.

(56) References Cited

U.S. PATENT DOCUMENTS

| | | |
|---|---|---|
| 4,315,665 A | 2/1982 | Haines |
| 4,715,702 A | 12/1987 | Dillon |
| 4,838,673 A | 6/1989 | Richards et al. |
| 4,840,444 A | 6/1989 | Hewitt |
| 4,873,029 A | 10/1989 | Blum |
| 4,934,792 A | 6/1990 | Tovi |
| 5,073,009 A | 12/1991 | Tovi |
| 5,147,585 A | 9/1992 | Blum |
| 5,219,497 A | 6/1993 | Blum |
| 5,432,623 A | 7/1995 | Egan et al. |
| 5,464,710 A | 11/1995 | Yang |
| 5,512,371 A | 4/1996 | Gupta et al. |
| 5,550,599 A | 8/1996 | Jannard |
| 5,702,819 A | 12/1997 | Gupta et al. |
| 5,757,459 A | 5/1998 | Bhalakia et al. |
| 5,928,718 A | 7/1999 | Dillon |
| 6,020,983 A | 2/2000 | Neu et al. |
| 6,159,397 A | 12/2000 | Friedman |
| 6,231,183 B1 | 5/2001 | Dillon |
| 6,416,178 B1 | 7/2002 | Friedman |
| 6,535,337 B1 | 3/2003 | Tanaka et al. |
| 6,719,928 B2 | 4/2004 | Dillon |
| 6,793,339 B1 | 9/2004 | Yip et al. |
| 7,443,608 B2 | 10/2008 | Dillon |
| 7,468,203 B2 | 12/2008 | Hicks |
| 7,719,777 B2 | 5/2010 | Dillon |
| 8,007,896 B2 | 8/2011 | Hicks |

*Primary Examiner* — Derek S Chapel

(74) *Attorney, Agent, or Firm* — William E. Hein

(57) ABSTRACT

A transparent multi-layer optical construction that reflects light in a diffuse manner and transmits light in an undistorted manner. The optical construction can be made as a sunglass lens or as a thin film to be used as window film. The multi-layer optical construction is, in part, a combination of surface form and surface texture combined with a reflective medium and a scratch resistant hard coating.

16 Claims, 4 Drawing Sheets

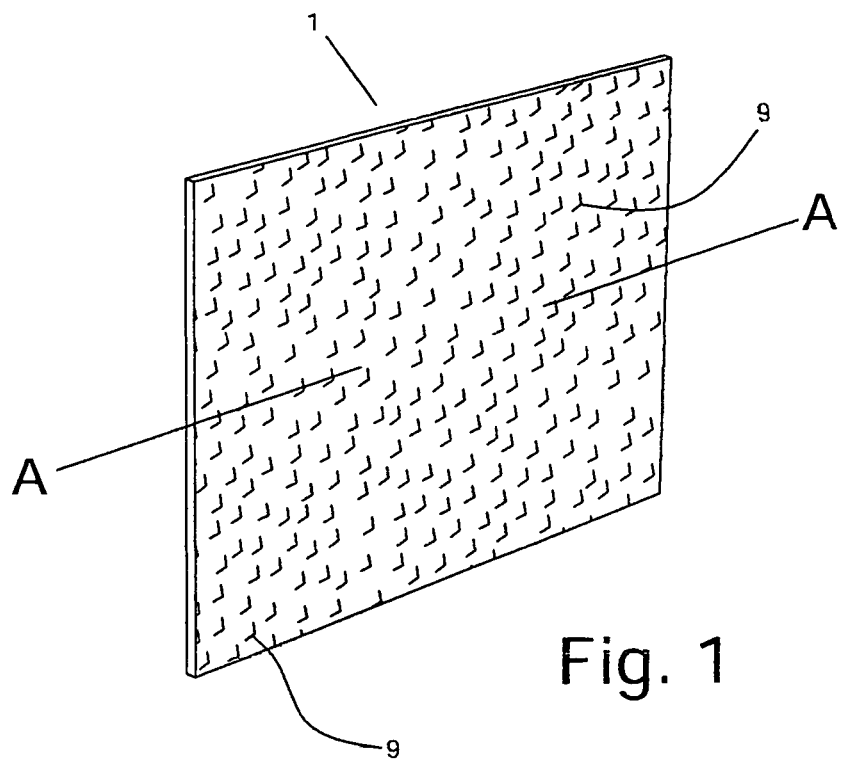
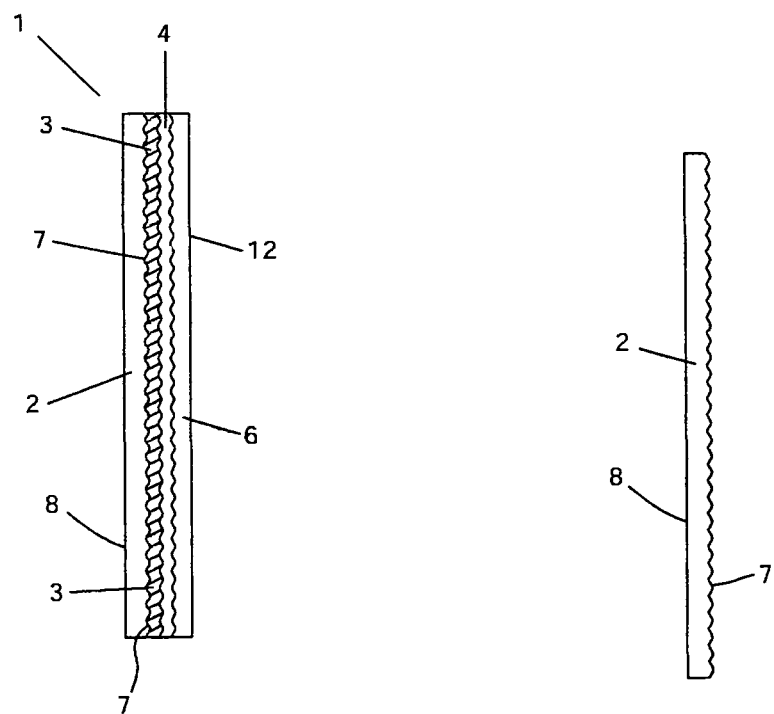
Fig. 1
Fig. 2    Fig. 3

DIFFUSE REFLECTING OPTICAL CONSTRUCTION

REFERENCE TO RELATED APPLICATION

This application incorporates the subject matter and claims the benefit of pending U.S. Provisional Patent Application Ser. No. 61/624,279 filed Apr. 14, 2012.

BACKGROUND AND SUMMARY OF THE INVENTION

The present invention relates to a low cost method for creating a composite thin sheet construction that reflects light in a diffuse manner while allowing a portion of the light striking the surface to pass through without being distorted, similar to that of a window.

Conventional transparent window film used for protection from the sun's rays, such as that used for automobiles and windows in buildings and homes, reflects light in a specular manner. Reflective type coatings such as aluminum are often applied to window films to reduce the amount of light and heat transmitted through them. The more reflective the window film is the more effective it can be; however, if it is too reflective, the reflection produced can be annoying and even hazardous to viewers, such as other drivers. This is because the reflection produced by a conventional window film is specular, like a mirror.

U.S. Pat. Nos. 7,443,608 and 7,719,777 to the present inventor, describe a sunglass lens construction that incorporates surface texture that reflects light in a diffuse manner while transmitting light in an undistorted manner.

The present invention describes a relatively low cost method for manufacturing a diffuse reflecting transparent optical construction that uses a scratch resistant hard coating to correct the distortion of light caused by the textured surface as well as to protect against scratching, abrasion and smudging.

The described optical construction can be laminated to or between sheets of rigid or semi-rigid plastic or glass. It can used in the manufacture of windows for homes, commercial buildings, automobiles or in the manufacturing of goggles or sunglass lenses.

BRIEF DESCRIPTION OF THE DRAWINGS

FIG. 1 is a perspective view of the optical construction in accordance with the present invention.

FIG. 2 is a cross-sectional diagram of the optical construction of FIG. 1, taken along section line A-A.

FIG. 3 is a cross-sectional diagram of one of the optical elements of FIG. 2

DESCRIPTION OF THE PREFERRED EMBODIMENT

Figure 4A:
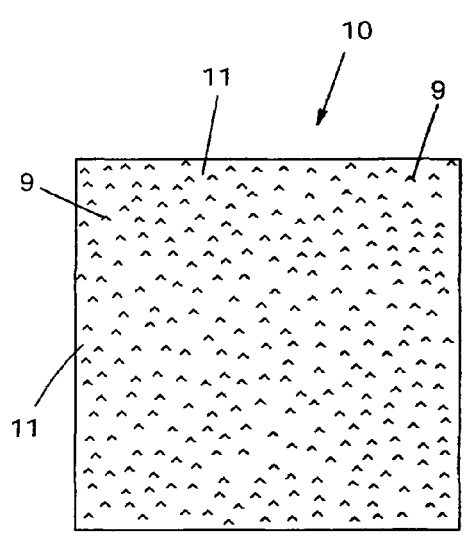
FIG. 4A is a front plan view of a stainless steel plate that simulates the reflective characteristics of the optical construction of FIG. 1.

The diffuse reflecting optical construction is a multi-layer light transmitting optical construction to be used as a window film or in an eyewear system such as a sunglass lens, goggle or face shield that reflects light in a uniform diffuse omni-directional manner and transmits light in a substantially undistorted manner. The following is a description of how the diffuse reflecting optical construction can be constructed and manufactured. The diffuse reflecting optical construction is, in part, composed of a base lens element and scratch resistant hard coating brought together with a reflective medium positioned between them. The base lens element includes a first surface. Prior to joining the base lens element and scratch resistant hard coating, a reflective medium is applied to the first surface of the base lens element. The first surface of the base lens element, upon which the reflective medium is applied, is comprised of a textured surface referred to as a diffuse reflecting form texture. The base lens element is a prefabricated substrate that can be in the form of a lens, a rigid sheet material or thin film. The second lens element is a scratch resistant hard coating that is applied to the reflective medium in liquid form and then subsequently hardened.

Referring to FIGS. 1-3, there is shown a diffuse reflecting optical construction 1 that reflects light in a diffuse manner and transmits light in a substantially undistorted manner. FIG. 2 shows a section view of diffuse reflecting optical construction 1 of FIG. 1 along section line A-A to illustrate individual optical elements. FIG. 2 shows a base lens element 2, a diffuse reflecting form texture 7, a reflective medium 3, an adhesion promoting coating 4 and a scratch resistant hard coating 6.

FIG. 3 shows a section view of base lens element 2 of FIG. 2. Base lens element 2 is an optical quality light transmitting substrate. Surface 8 of base lens element 2 is shown as having a surface that is optically smooth. Surface 7 represents the diffuse reflecting form texture which can be created by means of casting, molding or embossing, for example, at the time of manufacture of base lens element 2.

The diffuse reflecting form texture is a combination of both surface form and surface finish wherein the surface finish is a textured finish applied to the surface form. The surface form of the diffuse reflecting form texture is featureless. A featureless surface form, as defined herein, is a surface form that is void of surface irregularities formed by changing, varying and alternating elevations that create light and dark areas in reflected light that would otherwise cause an apparent decorative feature to stand out on the surface. An example of changing, varying and alternating surface elevations that create light and dark areas in reflected light which in turn cause a decorative feature to stand out on the surface is an indented or raised portion of a surface, such as a bas-relief, that in turn creates a likeness of a person's face. The textured finish is composed of peaks and valleys that fall within specified parameters. The arrangement of the peaks and valleys of the textured finish is random and continuous about the surface area of the featureless surface form within the area occupied by the diffuse reflecting form texture. An example of peaks and valleys arranged in a random and continuous manner is the arrangement of abrasive particles about the surface area of a new sheet of common sandpaper, wherein the top of each abrasive particle represents a peak and the surface area between a given abrasive particle and an adjacent abrasive particle represents a valley. The peaks and valleys of the textured finish of the diffuse reflecting form texture, and like sandpaper, are random in that each peak and each valley does not have a specific predetermined location relative to the surface upon which it is located. The peaks and valleys of the textured finish of the diffuse reflecting form texture and the described sandpaper are continuous in that each peak leads directly into an adjacent valley and each valley leads directly into an adjacent peak and as such forms a cyclical pattern that repeats itself throughout the entire surface area occupied by the peaks and valleys.

Figure 4B:
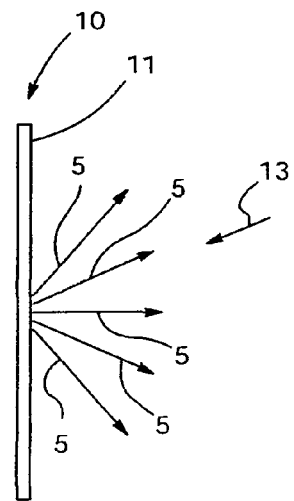
FIG. 4B is a side view of the stainless steel plate of FIG. 4A illustrating how light reflects off that surface.
Figure 4C:
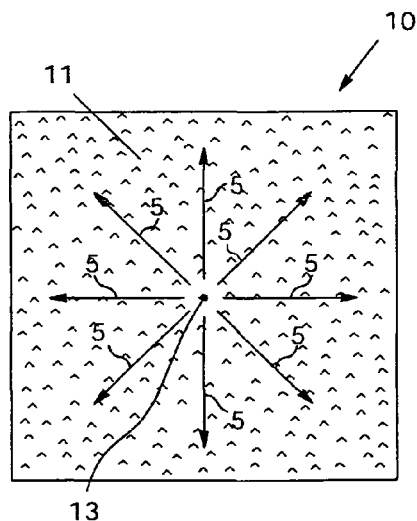
FIG. 4C is a front plan view of the stainless steel plate of FIG. 4A showing how light reflects off that surface.

To further illustrate what is meant by uniform diffuse omni-directional reflection, FIGS. 4A-C and 5A-C depict two stainless steel plates that reflect light in two distinctly different manners. Stainless steel plate 10 of FIGS. 4A-C has a surface in the form of the diffuse reflecting form texture and reflects light in a uniform diffuse omni-directional manner. Stainless steel plate 10 of FIGS. 4A and 4C is shown in plan view from the side that has the diffuse reflecting form texture. Upside down "V" symbols 9 of FIG. 4A represent the peaks and valleys of the textured finish of the diffuse reflecting form texture. FIG. 4B depicts stainless steel plate 10 in profile view wherein surface 11 represents the surface that has the diffuse reflecting form texture.

Figure 5A:
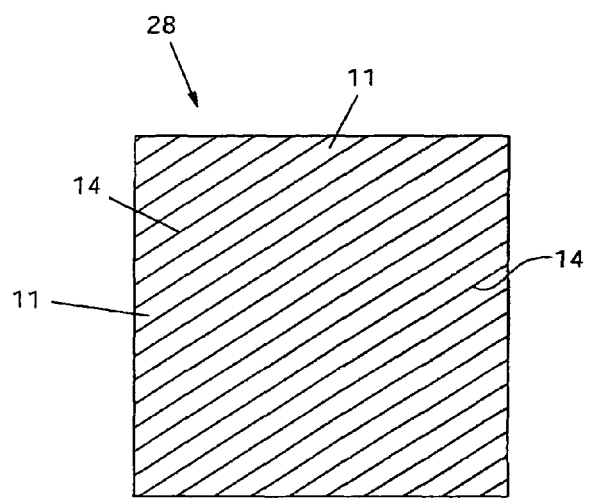
FIG. 5A is a front plan view of another stainless steel plate that reflects light in a bi-directional manner.
Figure 5B:
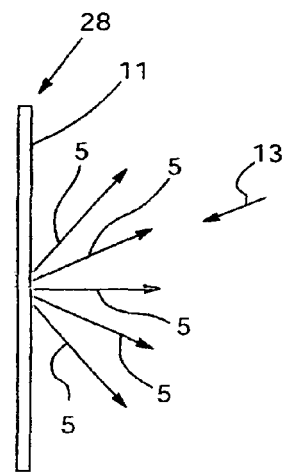
FIG. 5B is a side view of the stainless steel plate of FIG. 5A illustrating how light reflects off that surface.
Figure 5C:
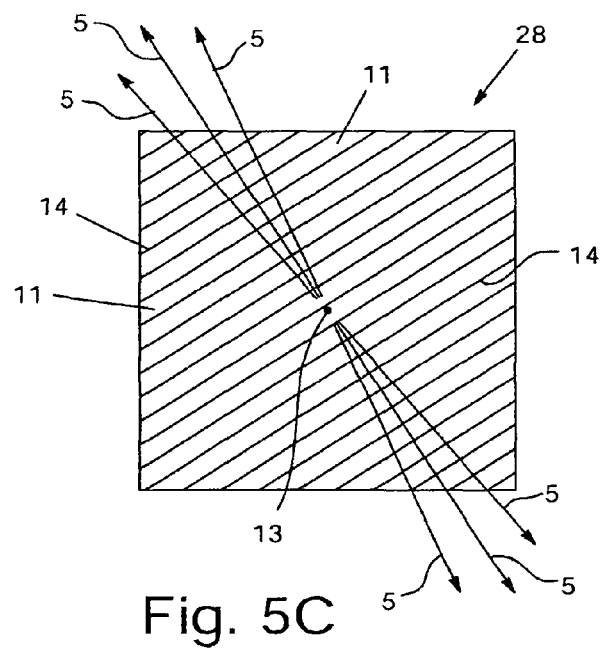
FIG. 5C is a front plan view of the stainless steel plate of FIG. 5A showing how light reflects off that surface.

Stainless steel plate 28 of FIGS. 5A-C has a brushed finish surface. The brushed finish reflects light in a bi-directional manner. Stainless steel plate 28 of FIGS. 5A and 5C is shown in plan view from the side having the brushed finish. FIG. 5B depicts stainless steel plate 28 in profile view wherein surface 11 represents the surface that has the brushed finish. The brushed finish is created by sandpaper or an abrasive pad wherein the sandpaper or abrasive pad creates a surface abrasion in the form of scratches that are generally linear and generally parallel to one another. Lines 14 of FIGS. 5A and 5C represent the scratches that make up the brushed finish of stainless steel plate 28.

FIGS. 4B and 4C illustrate the reflection created by the diffuse reflecting form texture. FIGS. 5B and 5C depict the bi-directional reflection created by the brushed finish. Arrow 13 of FIG. 4B represents an incident light ray striking surface 11 of stainless steel plate 10. Arrows 5 of FIG. 4B represent the light reflected from surface 11 of FIG. 4B. FIG. 4C illustrates incident light 13 and reflected light 5 of FIG. 4B in plan view. As can be seen in FIG. 4C, light rays 5 radiate approximately equally over three hundred sixty degrees. It is this type of reflection that is referred to as omni-directional reflection. The reflection is considered to be omni-directional because it radiates substantially symmetrically over three hundred sixty degrees from the point where incident light 13 of FIG. 4C strikes the surface of the diffuse reflecting form texture. Because the light is reflected in an omni-directional manner, it produces an apparent reflection under a wide range of lighting conditions and viewing angles. The reflection is considered to be uniform because incident light impinging on any given point about the diffuse reflecting form texture will be reflected in substantially the same omni-directional manner. In contrast to this type of reflection, FIGS. 5B and 5C depict how light rays reflect off the brushed finish. Light rays 5 are shown to reflect from surface 11 of FIG. 5C in a bi-directional manner perpendicular to scratch lines 14 depicted in FIGS. 5A and 5C. It should be noted that the described use of stainless steel in FIGS. 4A-C and 5A-C serves only as an example to illustrate the described reflections.

The peaks and valleys of the textured finish of the diffuse reflecting form texture are defined in terms of slope angle, roughness and peak density. Rdq (root mean square of mean slope) is a measurement that refers to slope angle wherein a slope is the surface portion that extends from a given valley to an adjacent peak. Rq (root mean square roughness) is a measurement that refers to roughness or surface height variations of the textured finish. RSm (mean spacing between profile peaks) is a measurement that refers to peak density. Rdq, Rq and RSm are standard measurements in the field of measuring surface roughness and physical characteristics. Essentially, the Rdq measurement is a weighted average of all the slope angles extending from the valleys to each valley's adjacent peak within a given measured line length or surface area of measurement. Similarly, Rq is a weighted average of surface roughness within a given measured line length or surface area of measurement. RSm measures the number of, what are called, profile peaks within a given line length or surface area of measurement.

As it relates to a highly reflective surface of the type described herein, the performance of the reflective surface in terms of diffuseness is largely determined by the Rdq value. For a given Rq value, shallower average slope angles result in lower Rdq values. Lower Rdq values result in reflections that are less diffuse and of higher contrast. Conversely, higher Rdq values result in reflections that are more diffuse and of decreased contrast. The individual slope angles, that is, a given slope connecting a particular valley to an adjacent peak of the diffuse reflecting form texture, are not necessarily entirely constant throughout and that is why the slope angle measurements are calculated as an average.

Figure 6:
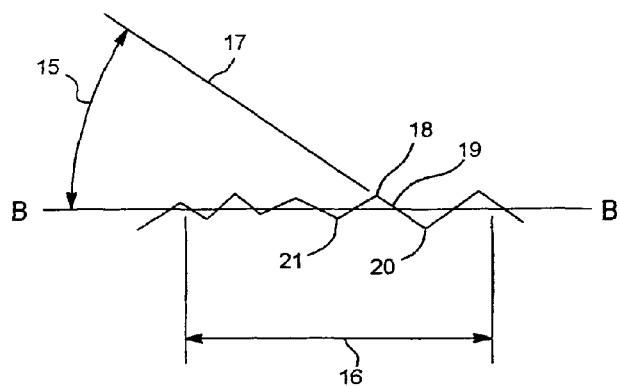
FIG. 6 is a cross-sectional instructional diagram of a textured surface illustrating the measurement of surface features.

The Rq measurement relates to the average distance, in terms of depth, measured from the bottom of the valleys to the tops of the peaks, or in other words, the amplitude. Lower Rq values mean a shallower average depth between the tops of the peaks and the bottom of the valleys. This generally results in a finer textured finish. Conversely, greater Rq values mean a greater average depth from the tops of the peaks to the bottom of the valleys. This generally results in a coarser textured finish. It is important that a relatively low Rq value be maintained in order to minimize the potential negative effects on the optical performance due to possible mismatches in refractive indices. It has been found that a textured finish of the type described herein having an Rdq value, Rq value and RSm value falling within a narrowly specified range can produce good reflectivity and a sufficient amount of diffuseness in reflected light. Referring now to FIG. 6, there is shown an enlarged profile section view of a textured finish depicting the peaks and valleys of the surface having a given Rdq, Rq and RSm value. The illustration is simplified in that the slopes connecting the peaks and valleys are shown as being straight as opposed to varying forms and degrees of continuous arcs that would be more representative of the actual textured finish of the diffuse reflecting form texture. Nonetheless, FIG. 6 sufficiently illustrates the measurements Rdq, Rq and RSm. Peak 18 represents a single peak, and valleys 20 and 21 represent two valleys on either side of peak 18 of the illustrated textured finish. Dimension 16 represents the line length of the textured finish that is being measured. Reference line B-B represents the mean surface elevation, also referred to as a least square line, of the peaks and valleys such that equal areas of the textured finish profile within line length 16 lie above and below it. Reference line 17 is parallel to slope 19 that extends between peak 18 and valley 20. The angle of slope 19, as indicated by angle 15 of FIG. 6, is determined by the angle between reference lines 17 and B-B. The average slope angle for the given line length 16 of the textured finish is simply the sum of all the slope angles averaged together. In a similar manner, if some or all of the slopes of a given textured finish are arcs as opposed to straight line slopes, the slope angle of each slope is provided as an average, and all of the averaged slope angles are again averaged, resulting in an average slope angle along the line length measured. FIG. 6 serves only to explain what is meant by "slope angle" or "average slope angle" and is not intended as an explanation of the well-known mathematics involved in calculating the root mean square of mean slope (Rdq). Rq is determined by measuring the surface height variations, such as the distance between peak 18 and valley 20, of all the peaks and valleys measured perpendicularly to reference line B-B within line length 16. As is the case of Rdq, FIG. 6 serves only to explain what is meant by "surface height variations" or "roughness" and is not intended to fully explain the routine mathematics involved in calculating the root mean square roughness (Rq). RSm is determined by counting the number of profile peaks within line length 16. A profile peak is the highest point of the profile between an upward and downward crossing of the mean line such as mean line B-B. Peak 18 represents a profile peak in that peak 18 is above mean line B-B, and corresponding valleys 20 and 21 are below mean line B-B. The RSm value relates to the average distance between peaks within a given line length. It is determined by the number of profile peaks counted in a given line length divided by the line length.

The manner in which the Rdq, Rq and RSm measurements are obtained is in accordance with industry standards for surface measurements. The Rdq, Rq and RSm measurements of the preferred embodiment of the present invention are made using a contact stylus measuring device and certain parameters. The parameters used for measuring the textured finish and acquiring the Rdq, Rq and RSm values include stylus tip radius, spatial frequencies, data density and minimum line length to be measured. The stylus tip radius is two micrometers. The spatial frequencies are one hundred microinches at the lower end and thirty one-thousandths of an inch on the upper end. The data density is an industry standard of approximately one data point per ten micro-inches (or, in metric units, approximately four data points per micron) of horizontal travel across the surface being measured. The minimum line length to be measured is eight millimeters. The Rdq of the textured finish of the diffuse reflecting form texture of the preferred embodiment is greater than 0.75 degrees and less than 6.5 degrees, and the Rq of the textured finish of the diffuse reflecting form texture of the preferred embodiment is greater than 5.9 micro-inches and less than 25.0 micro-inches. The RSm of the textured finish is greater than 0.0009 inches and less than 0.007 inches.

The diffuse reflecting form texture is defined by a combination of the following parameters: a) the range of Rdq, Rq and RSm of the textured finish in combination with the parameters set forth for measuring the textured finish and obtaining the Rdq, Rq and RSm values; b) the featureless surface form upon which the textured finish is applied; and c) the random and continuous manner in which the peaks and valleys of the textured finish are arranged on the featureless surface. The diffuse reflecting form texture of base lens element 2 can be created by means of replicating the textured pattern in an embossing process or during a casting or injection molding process.

The reflection produced by the diffuse reflecting form texture, in combination with a suitable reflective medium, is an easily perceived soft satin like appearance that reflects incident light impinging thereon in a uniform, diffuse and omnidirectional manner substantially void of specular reflection. The reflection produced is lustrous but not mirror like. In other words, it is between a glossy and matte finish in appearance. In addition to reflecting light in a diffuse manner, the diffuse reflecting form texture works to prevent distracting internal reflections within the optical construction. The resulting diffuse reflecting optical construction reflects light as described in a wide range of lighting conditions and viewing angles.

Figure 7:
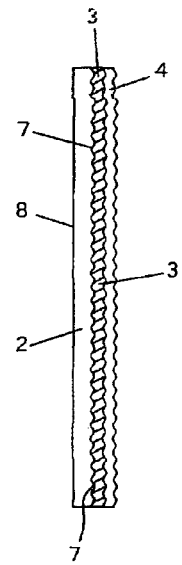
FIG. 7 is a cross-sectional diagram showing the application of a reflective medium and an adhesion promoting coating to the optical element illustrated in FIG. 3.

FIG. 7 shows base lens element 2 of FIG. 3 with reflective medium 3 applied to surface 7 and adhesion promoting coating 4 applied to reflective medium 3. Reflective medium 3, which may be aluminum, for example, is very thin, measuring generally only a few angstroms in thickness and can be applied by the well-known processes of sputter coating or vacuum deposition. Reflective medium 3 conforms to and highlights the diffuse reflecting form texture 7. The reflective medium 3 reflects a fraction of the light impinging thereon and allows the remainder to pass through. Upside down "V" symbols 9 of FIG. 1 represent the peaks and valleys of surface 7 made apparent by the reflective medium 3. The adhesion promoting coating 4 is very thin and substantially conforms to the peaks and valleys created by surface 7. Adhesion promoting coating 4 can be applied by the well-known processes of flow coating, dip coating or spin coating. When coating sheet material such as polyester, the method of dip coating or flow coating is commonly employed using a well-known system called a continuous coating web. When coating optical lenses, the methods of spin coating as well as flow coating and dip coating can be used. Surface 7, having both reflective medium 3 and adhesion promoting coating 4 applied thereon, is herein referred to as the prepared textured surface.

FIG. 2 shows the optical construction of FIG. 7 with scratch resistant hard coating 6 applied to the prepared textured surface. The scratch resistant coating 6 is applied in liquid form and allowed to flow over the prepared textured surface. Similar to that of the adhesion promoting coating 4, scratch resistant hard coating 6 can be applied by the well-known processes of flow coating, dip coating or spin coating. When applying the scratch resistant coating to sheet material such as polyester, the method of dip coating or flow coating can be employed. When coating optical lenses the well-known method of spin coating as well as flow coating and dip coating can be used. Depending on the type of scratch resistant coating 6 being used, it is cured following application to a hardened state by thermal cure or exposure to ultra violet light.

Scratch resistant hard coatings are commonly available and well known in the optical industry. Scratch resistant hard coatings are a hardenable liquid polymer, they are thick in viscosity and, depending on the type of coating being used, the resulting thickness of scratch resistant hard coating 6 can range from 4 to 15 microns. As the scratch resistant coating 6 is applied it flows out evenly, filling in the peaks and valleys of the prepared textured surface, forming an outer surface 12 that is substantially optically smooth. Most scratch resistant hard coatings are non-tintable, and are referred to as "non tintable"; however, some types of scratch resistant hard coatings are tintable which simply means that the hard coating can be tinted, using commonly available molecular catalytic dyes, after being cured to a hardened state. The purpose of tinting a hard coating is to create a desired aesthetic appearance or for the purpose of attenuating transmitted light.

Adhesion promoting coating 4 is incorporated to improve the adhesion of scratch resistant hard coating 6 to reflective medium 3. The adhesion promoting coating 4 used is a silane coupling agent and is commonly available from manufacturers such as Dow Corning. Alternatively, scratch resistant hard coating 6 can be formulated to adhere directly to reflective medium 3 without the additional use of the adhesion promoting coating 4.

Prior to applying scratch resistant hard coating 6 to the prepared textured surface, the peaks and valleys of surface 7 of base lens element 2 distort light that is transmitted through it in a manner that is similar to frosted glass. This is because the refractive index of the base substrate and that of air differ greatly. Base lens element 2 and scratch resistant hard coating 6 both have unique refractive indices; the more closely matched the two refractive indices are, the less light will be distorted when traveling between the two elements. The refractive index of the base substrate is determined by the type of material used to create it. For example, if base lens element 2 is made of polycarbonate, the refractive index of the base substrate will be approximately 1.58. Therefore, the objective is to use a scratch resistant hard coating that has a refractive index that is equal to or near 1.58.

With further reference to FIG. 2, base lens element 2 and scratch resistant hard coating 6 have similar refractive indices, and surfaces 8 and 12 are substantially parallel to one another. The result of the diffuse reflecting optical construction of FIG. 1 is that it reflects light in a manner that is scattered or diffuse and transmits light in a manner that is substantially undistorted.

Figure 8:
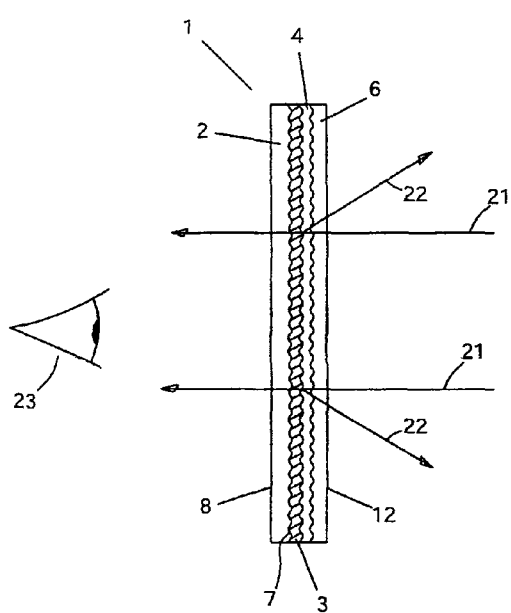
FIG. 8 is a cross-sectional diagram taken along the line A-A of the optical construction of FIG. 1, illustrating the effects of light rays as they pass through the optical construction.

When light enters the diffuse reflecting optical construction, only a portion of that light will pass through its entirety. Some of the total amount of light will be reflected and some will be absorbed. FIG. 8 illustrates how the diffuse reflecting optical construction of FIG. 1 works. Light rays 21 are shown passing through diffuse reflecting optical construction 1 to the eye 23 of a person looking through the optical construction. To a great extent, light rays that pass through the entirety of diffuse reflecting optical construction 1 remain parallel to one another and therefore undistorted. Upon striking the reflective coated interface of surface 7, a portion of light rays 21 is reflected by reflective medium 3 in a diffuse or scattered manner as illustrated by light rays 22. Likewise, the diffuse reflecting optical construction can be turned around, in which case the eye of the viewer would be adjacent scratch resistant coating 6. Light rays would enter base lens element 2. A portion of the light would reflect in a diffuse manner off of reflective medium 3, and the remainder would pass through diffuse reflecting optical construction 1 as previously described.

Figure 9:
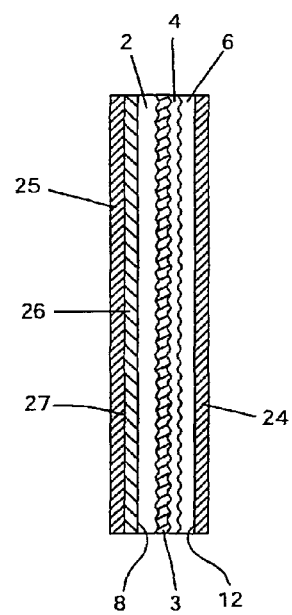
FIG. 9 is a cross-sectional diagram showing the application of an additional hard coating and anti-reflective coatings to the optical construction of FIG. 2.

FIG. 9 shows diffuse reflecting optical construction 1 of FIG. 2 having a scratch resistant hard coating 26 applied to surface 8 of base lens element 2 and anti-reflective coatings 25 and 24 applied to scratch resistant hard coating surfaces 27 and 12, respectively. Anti-reflective coatings can be used to reduce reflections created by optically smooth surfaces 27 and 12 and thus improve the optical performance of the diffuse reflecting optical construction.

For the purpose of attenuating transmitted light, light absorbing tint can be incorporated into the base lens element 2 or scratch resistant coating 6. If desired, a polarized film can be incorporated into lens element 2.

When combined with the type of textured surface described herein, the use of the scratch resistant hard coating 6 provides an efficient and relatively low cost step in the manufacturing process. The scratch resistant hard coating 6 is relatively thin in that it does not add much to the overall thickness of the completed diffuse reflecting optical construction. When combined with a thin film substrate such as polyester, as it relates to base lens element 2, the overall thickness of the completed optical construction can be less than 10 mil (or 0.010") which is advantageous when fabricating the diffuse reflecting optical construction as a thin film. Essentially, the overall thickness of the completed diffuse reflecting optical construction 1 is determined by the thickness of the base lens substrate as it would relate to base lens element 2.

Manufactured as a thin film, the diffuse reflecting optical construction 1 can be used as window film that can be incorporated in the manufacture of home or commercial building windows and automobile windows. Additionally, the thin film can be laminated to or between semi-rigid transparent sheet material such as polycarbonate and subsequently cut and curved, or thermoformed, for use in the application of sunglass lenses, goggles and face shields. Alternatively, if the diffuse reflecting optical construction is intended to be manufactured as a sunglass lens, base lens element 2 can be thicker in cross section, for example, 1.5 to 2.5 millimeters thick, spherical in form (like a conventional sunglass lens) and made from materials such as allyl diglycol carbonate, nylon or polycarbonate.

I claim:

1. A method of manufacturing a diffuse reflecting optical construction, comprising:
   providing a single light transmitting base lens element, said single light transmitting base lens element having first and second surfaces, said first surface comprising a diffuse reflecting form texture, said diffuse reflecting form texture having a surface finish, said surface finish comprising a random and continuous series of peaks and valleys, said peaks and valleys having a slope angle (Rdq) greater than 0.75 degrees and less than 6.5 degrees, an amplitude (Rq) greater than 5.9 micro-inches and less than 25.0 micro-inches, and a peak density (RSm) greater than 0.0009 inches and less than 0.007 inches;
   applying a reflective medium to said diffuse reflecting form texture, said reflective medium reflecting a fraction of light impinging thereon, a remainder of the light impinging thereon passing through said reflective medium, said reflective medium applied to said diffuse reflecting form texture representing a prepared first surface of said first light transmitting lens element;
   coating said reflective medium with a hardenable liquid polymer; and
   curing said liquid polymer coating to a hardened state, said hardened polymer coating having a thickness of 4 to 15 microns, said hardened polymer coating forming an outer third surface of said diffuse reflecting optical construction.

2. A method as in claim 1 wherein said outer third surface is substantially optically smooth.

3. A method as in claim 1 further comprising applying an adhesion promoting coating to said reflective medium prior to coating said reflective medium with said hardenable liquid polymer.

4. A method as in claim 3 wherein said adhesion promoting coating is a silane.

5. A method as in claim 1 further comprising applying an anti-reflective coating to said second surface of said single light transmitting base lens element.

6. A method as in claim 1 further comprising applying a hardenable liquid polymer to said second surface of a said single light transmitting base lens element, said hardenable liquid polymer being cured to a hardened state.

7. A method as in claim 6 further comprising applying an anti-reflective coating to said hardened polymer coating.

8. A method as in claim 1 further comprising applying an anti-reflective coating to said outer third surface of said diffuse reflecting optical construction.

9. A diffuse reflecting optical construction comprising:
a single light transmitting base lens element having first and second surfaces, said first surface comprising a diffuse reflecting form texture, said diffuse reflecting form texture having a surface finish, said surface finish comprising a random and continuous series of peaks and valleys, said peaks and valleys having a slope angle (Rdq) greater than 0.75 degrees and less than 6.5 degrees, an amplitude (Rq) greater than 5.9 micro-inches and less than 25.0 micro-inches, and a peak density (RSm) greater than 0.0009 inches and less than 0.007 inches;
a reflective medium applied to said diffuse reflecting form texture, said reflective medium reflecting a fraction of light impinging thereon, a remainder of the light impinging thereon passing through said reflective medium, said reflective medium applied to said diffuse reflecting form texture representing a prepared first surface of said light transmitting base lens element; and
a hardened liquid polymer coating applied to said prepared first surface, said liquid polymer coating being cured to a hardened state, said hardened polymer coating having a thickness of 4 to 15 microns, said hardened polymer coating having third and fourth surfaces, said third surface of said hardened polymer coating conforming to said prepared first surface of said single light transmitting base lens element; said fourth surface of said hardened polymer coating forming an outer surface of said diffuse reflecting optical construction.

10. A diffuse reflecting optical construction as in claim 9 wherein said outer surface of said diffuse reflecting optical construction is substantially optically smooth.

11. A diffuse reflecting optical construction as in claim 9 further comprising applying an adhesion promoting coating to said reflective medium, said adhesion promoting coating being positioned between said reflective medium and said third surface of said hardened polymer coating.

12. A diffuse reflecting optical construction as in claim 11 wherein said adhesion promoting coating is a silane.

13. A diffuse reflecting optical construction as in claim 9 further comprising applying an anti-reflective coating to said second surface of said single light transmitting base lens element.

14. A diffuse reflecting optical construction as in claim 9 further comprising applying a hardenable liquid polymer coating to said second surface of said single light transmitting base lens element, said liquid polymer coating being cured to a hardened state.

15. A diffuse reflecting optical construction as in claim 14 further comprising applying an anti-reflective coating to said hardened polymer coating.

16. A diffuse reflecting optical construction as in claim 9 further comprising applying an anti-reflective coating to said fourth surface of said hardened polymer coating.

* * * * *